United States Patent
Ma et al.

(10) Patent No.: US 11,534,830 B2
(45) Date of Patent: Dec. 27, 2022

(54) TANTALUM POWDER AND PREPARATION METHOD THEREFOR

(71) Applicant: NINGXIA ORIENT TANTALUM INDUSTRY CO., LTD., Shizuishan (CN)

(72) Inventors: Haiyan Ma, Shizuishan (CN); Hui Li, Shizuishan (CN); Guoqing Luo, Shizuishan (CN); Yuewei Cheng, Shizuishan (CN); Chunxia Zhao, Shizuishan (CN); Xueqing Chen, Shizuishan (CN); Zhidao Wang, Shizuishan (CN); Fukun Lin, Shizuishan (CN); Guoqi Yang, Shizuishan (CN); Ning Wang, Shizuishan (CN); Yinghui Ma, Shizuishan (CN); Yanjie Wang, Shizuishan (CN); Lijun Li, Shizuishan (CN); Honggang Zhang, Shizuishan (CN)

(73) Assignee: NINGXIA ORIENT TANTALUM INDUSTRY CO., LTD, Shizuishan (CN)

( * ) Notice: Subject to any disclaimer, the term of this patent is extended or adjusted under 35 U.S.C. 154(b) by 0 days.

(21) Appl. No.: 16/958,150

(22) PCT Filed: Dec. 27, 2017

(86) PCT No.: PCT/CN2017/119324
§ 371 (c)(1),
(2) Date: Jun. 25, 2020

(87) PCT Pub. No.: WO2019/127200
PCT Pub. Date: Jul. 4, 2019

(65) Prior Publication Data
US 2021/0060654 A1  Mar. 4, 2021

(51) Int. Cl.
| | | |
|---|---|---|
| B22F 9/20 | (2006.01) | |
| B22F 3/10 | (2006.01) | |
| B22F 9/04 | (2006.01) | |
| B22F 1/05 | (2022.01) | |
| B22F 1/142 | (2022.01) | |
| H01G 9/042 | (2006.01) | |
| C22C 1/04 | (2006.01) | |
| B22F 9/24 | (2006.01) | |
| C22C 27/02 | (2006.01) | |
| H01G 9/052 | (2006.01) | |

(52) U.S. Cl.
CPC ................ *B22F 9/20* (2013.01); *B22F 1/05* (2022.01); *B22F 1/142* (2022.01); *B22F 3/1003* (2013.01); *B22F 9/04* (2013.01); *B22F 9/24* (2013.01); *C22C 1/045* (2013.01); *C22C 27/02* (2013.01); *H01G 9/042* (2013.01); *H01G 9/0525* (2013.01); *B22F 2301/20* (2013.01); *B22F 2998/10* (2013.01)

(58) Field of Classification Search
CPC . B22F 1/05; B22F 1/052; C22C 1/045; C22C 27/02
See application file for complete search history.

(56) References Cited

U.S. PATENT DOCUMENTS

| | | | |
|---|---|---|---|
| 4,645,533 A | 2/1987 | Izumi | |
| 5,082,491 A * | 1/1992 | Rerat | C22C 1/045 75/255 |
| 6,193,779 B1 | 2/2001 | Reichert et al. | |
| 6,238,456 B1* | 5/2001 | Wolf | C22C 1/045 75/622 |
| 6,479,012 B2* | 11/2002 | Rao | C22C 1/045 419/36 |
| 2003/0174459 A1 | 9/2003 | Noguchi et al. | |
| 2003/0183042 A1* | 10/2003 | Oda | H01G 9/0525 75/255 |

(Continued)

FOREIGN PATENT DOCUMENTS

| | | |
|---|---|---|
| CN | 1247575 A | 3/2000 |
| CN | 1437517 A | 8/2003 |

(Continued)

OTHER PUBLICATIONS

International Search Report and Written Opinion issued in corresponding International Application No. PCT/CN2017/119324 dated Jun. 27, 2018 (12 pages).
Extended European Search Report issued in corresponding European Patent Application No. 17936755.2, dated Jun. 21, 2021.

*Primary Examiner* — Kevin E Yoon
*Assistant Examiner* — Austin Pollock
(74) *Attorney, Agent, or Firm* — Pillsbury Winthrop Shaw Pittman, LLP

(57) ABSTRACT

A tantalum powder, a tantalum powder compact, a tantalum powder sintered body, a tantalum anode, an electrolytic capacitor and a preparation method for tantalum powder. The tantalum powder contains boron element, and the tantalum powder has a specific surface area of greater than or equal to 4 m$^2$/g; the ratio of the boron content of the tantalum powder to the specific surface area of the tantalum powder is 2~16; the boron content is measured in weight ppm, and the specific surface area is measured in m$^2$/g; Powder that can pass through a ρ-mesh screen in the tantalum powder accounts for over 85% of the total weight of the tantalum powder, where ρ=150~170; and the tantalum powder with high CV has a low leakage current and dielectric loss, and good moldability.

9 Claims, No Drawings

(56) References Cited

U.S. PATENT DOCUMENTS

| | | | | |
|---|---|---|---|---|
| 2007/0068341 A1* | 3/2007 | Cheng | ................ | H01G 9/0525 |
| | | | | 75/255 |
| 2008/0273292 A1* | 11/2008 | Sato | ..................... | C22C 1/045 |
| | | | | 75/252 |
| 2009/0080145 A1* | 3/2009 | Mizusaki | ............... | B22F 1/148 |
| | | | | 75/228 |
| 2010/0326239 A1* | 12/2010 | Shi | ......................... | B22F 9/20 |
| | | | | 75/343 |
| 2012/0081840 A1* | 4/2012 | Matsuoka | ............ | H01G 9/052 |
| | | | | 419/30 |
| 2014/0076462 A1* | 3/2014 | Zheng | ..................... | C23C 8/10 |
| | | | | 118/724 |
| 2016/0314904 A1* | 10/2016 | Yang | ...................... | H01G 9/15 |
| 2017/0072462 A1 | 3/2017 | Li et al. | | |
| 2018/0144874 A1* | 5/2018 | Yin | ........................ | C22C 27/02 |

FOREIGN PATENT DOCUMENTS

| | | | | |
|---|---|---|---|---|
| CN | 1449316 A | | 10/2003 | |
| CN | 103601242 A | | 2/2012 | |
| CN | 102806345 A | | 12/2012 | |
| CN | 103934452 A | * | 7/2014 | |
| CN | 104858436 A | | 8/2015 | |
| CN | 106964772 A | * | 7/2017 | ............ B22F 1/0011 |
| EP | 1 291 100 A1 | | 12/2003 | |
| JP | 2014-098201 | | 5/2014 | |
| JP | 2014098201 A | * | 5/2014 | |
| WO | 2006/062234 | | 6/2006 | |
| WO | WO-2006062234 A1 | * | 6/2006 | ................ B22F 9/24 |
| WO | WO-2016026092 A1 | * | 2/2016 | ................ B22F 1/00 |
| WO | WO-2016070303 A1 | * | 5/2016 | ............ B22F 1/0003 |

* cited by examiner

TANTALUM POWDER AND PREPARATION METHOD THEREFOR

CROSS-REFERENCE TO RELATED APPLICATION(S)

This application is the U.S. national phase entry of PCT Patent Application No. PCT/CN2017/119324, filed on Dec. 28, 2017, which is incorporated herein in its entirety b reference.

TECHNICAL FIELD

The invention relates to the field of metallurgy, and particularly, relates to a tantalum powder and preparation method thereof.

BACKGROUND ART

A tantalum electrolytic capacitor is a capacitor formed by anodizing a tantalum metal to form tantalum oxide which serves as a dielectric on the surface of the capacitor and using an electrolyte as a cathode. The tantalum electrolytic capacitor has a plurality of excellent performances for example high capacitance, long service life, high reliability, good temperature and efficiency characteristic, adaptable to severe environment and the like, and is widely applied to communication equipment, computers, automotive electronics and national defense industry. With the development of electronic assembly technology towards automation, miniaturization, high-speed processing and low power consumption, higher requirements are put forward on the quality of tantalum capacitors.

SUMMARY OF THE INVENTION

One aspect of the invention provides a tantalum powder, wherein the tantalum powder contains boron element, and the tantalum powder has a specific surface area of greater than or equal to 4 $m^2/g$; the ratio of the boron content of the tantalum powder to the specific surface area of the tantalum powder is 2~16, the boron content is measured in unit of ppm by weight, and the specific surface area is measured in unit of $m^2/g$; more than 85% of the total weight of the tantalum powder can pass through $\rho$ mesh, $\rho$=150~170.

In one embodiment, the tantalum powder has a specific surface area of 4 to 20 $m^2/g$, for example 5 to 15 $m^2/g$, for example 5 to 12 $m^2/g$, for example 6, 7, 8, 9, 10, 11 $m^2/g$.

In one embodiment, more than 88% of the total weight of the tantalum powder can pass through $\rho$ mesh, for example 90% or more, for example 95% or more.

In one embodiment, $\rho$=150, 160 or 170.

In one embodiment, the ratio of the boron content of the tantalum powder to the specific surface area of the tantalum powder is 2 to 16, for example 3 to 15, for example 4 to 14, for example 5, 6, 7, 8, 9, 10, 11, 12 or 13.

In one embodiment, the tantalum powder contains oxygen element and nitrogen element, and the ratio of the oxygen content of the tantalum powder to the nitrogen content of the tantalum powder is 2 to 16, preferably 2 to 12, preferably 2 to 10, preferably 2 to 8.

In one embodiment, the tantalum powder has a FSSS particle size of 0.4 to 2.0 μm, preferably 0.4 to 1.6 μm, more preferably 0.6 to 1.2 μm, for example 0.5 μm, 0.6 μm, 0.7 μm, 0.8 μm, 0.9 μm, 1.0 μm.

In one embodiment, the tantalum powder has a bulk density of 0.8 to 2.0 $g/cm^3$, preferably 0.8 to 1.8 $g/cm^3$, preferably 0.8 to 1.6 $g/cm^3$.

In one embodiment, substantially all of the tantalum powder can pass through a 100 mesh screen. For example, more than 98 wt % of the tantalum powder can pass through a 100 mesh screen, for example more than 99 wt % can pass through a 100 mesh screen, for example more than 100 wt % can pass through a 100 mesh screen.

In one embodiment, in the tantalum powder, 3% to 15%, for example 4.85% to 13.68%, for example 5.46% to 7.22%, of the total weight of the tantalum powder cannot pass through a 170 mesh screen.

In one embodiment, the powder that can pass through 170 mesh while cannot pass through 400 mesh in the tantalum powder accounts for 60% to 80%, for example 62% to 78%, for example 66% to 74% of the total weight of the tantalum powder.

In one embodiment, less than 40%, for example less than 35%, for example less than 30%, for example less than 25%, for example less than 20%, for example less than 15%, for example less than 10%, for example 5 to 40%, for example 8.84 to 32.22%, for example 19.68 to 28.46% of the total weight of the tantalum powder can pass through a 400 mesh screen.

In one embodiment, powder that cannot pass through 170 mesh accounts for 0.8 η to 1.2 η, for example, 0.9 η to 1.1 η, for example η, of the total weight of the tantalum powder; η=−4.55 E−02 $x^3$+1.39 E+00 $x^2$−1.45 E+01 x+5.70 E+01, where x is the specific surface area of the tantalum powder in $m^2/g$.

In one embodiment, the powder that can pass through 170 mesh while cannot pass through 400 mesh in the tantalum powder accounts for 0.8 ζ to 1.2 ζ for example 0.9 ζ to 1.1 ζ, for example ζ, of the total weight of the tantalum powder; ζ=−0.11 $x^2$−0.40 x+82.33, where x is the specific surface area of the tantalum powder in $m^2/g$.

In one embodiment, powder that can pass through 400 mesh in the tantalum powder accounts for 0.8 θ to 1.2θ, for example 0.9 θ to 1.1θ, for example θ, of the total weight of the tantalum powder; θ=−0.15 $x^2$+6.01 x−17.44, where x is the specific surface area of the tantalum powder in $m^2/g$.

In one embodiment, the tantalum powder has a density of from 0.8 τ to 1.2 τ $g/cm^3$, for example from 0.9 τ to 1.1 τ $g/cm^3$, for example τ $g/cm^3$, τ is mathematically related to the specific surface area x (in $m^2/g$) of the tantalum powder as follows: τ=−6.14 E−03 $x^2$+2.53 E−02 x+1.82 E+00, and x is the specific surface area of tantalum powder in $m^2/g$.

In one embodiment, the tantalum powder has a FSSS particle size of 0.8 Ψ to 1.2 Ψ, for example 0.9 Ψ to 1.1 Ψ, for example Ψ, Ψ is mathematically related to the specific surface area x (in $m^2/g$) of the tantalum powder as follows: Ψ=−2.22 E−03 $x^3$+4.39 E−02 $x^2$−2.93 E−01 x+1.64 E+00, x is the specific surface area of tantalum powder in $m^2/g$.

In one embodiment, the tantalum powder has an oxygen content of 5000 to 50000 ppm, for example 10000 to 40000 ppm, for example 10000 to 31000 ppm, for example 16500 to 25700 ppm.

In one embodiment, the tantalum powder has a nitrogen content of 1000 to 5000 ppm, for example 2000 to 4000 ppm, for example 2400 to 3300 ppm, for example 3000 to 3300 ppm.

In one embodiment, the tantalum powder has a potassium content of 10 to 50 ppm, for example 20 to 40 ppm, for example 28 to 34 ppm.

In one embodiment, the tantalum powder has a boron content of 20 to 200 ppm, for example 20 to 150 ppm, for example 20 to 120 ppm, for example 40 to 120 ppm.

In one embodiment, the tantalum powder has a phosphorous content of 100 to 600 ppm, for example 200 to 400 ppm.

In one embodiment, the tantalum powder has an oxygen content of 0.8 α to 1.2 α ppm (for example, 0.9 α to 1.1 α ppm, for example, α ppm), $\alpha=-26.7\ x^3+802.4\ x^2-4496.9\ x+16038.2$.

In one embodiment, the tantalum powder has a nitrogen content of 0.8 β to 1.2 β ppm (for example, 0.9 β to 1.1 β ppm, for example, β ppm) with $\beta=197.1\ x+995.0$.

In one embodiment, the tantalum powder has a boron content of from 0.8 γ to 1.2 γ ppm (for example from 0.9 γ to 1.1 γ ppm, for example, γ ppm), $\gamma=-0.48\ x^3+13.95\ x^2-108.84\ x+277.20$.

In one embodiment, the ratio of the boron content of the tantalum powder to the specific surface area x (in m²/g) of the tantalum powder is from 0.8 χ to 1.2 χ, for example from 0.9 χ to 1.1 χ, and for example χ, $\chi=-6.11\ E-02\ x^3+1.63\ E+00\ x^2-1.25\ E+01\ x+3.39\ E+01$.

In one embodiment, the tantalum powder has a potassium content of from 0.8 ε to 1.2 ε ppm (for example from 0.9 ε to 1.1 ε ppm, for example, ε ppm), $\varepsilon=0.45\ x^3-10.48\ x^2+79.94\ x-173.43$.

In one embodiment, the tantalum powder has a ratio of oxygen content to nitrogen content of 0.8λ to 1.22λ (for example, 0.9λ to 1.1λ, for example, λ), $\lambda=0.62\ x+2.04$.

In one embodiment, α, β, γ, ε, λ are all positive numbers.

In one embodiment, x is the specific surface area of the tantalum powder in m²/g.

In one embodiment, x is 4~20, for example x is 4~12, for example x is 5, 6, 7, 8, 9, 10, 11, 12, 13, 14, 15, 16, 17, 18 or 19.

In one embodiment, the specific capacitance of the tantalum powder is 200000 μFV/g or more, for example 200000 to 580000 μFV/g.

In one embodiment, the tantalum powder (for example 30 mg of the tantalum powder) is compressed into a tantalum powder compact (for example a cylindrical tantalum powder compact with a diameter of 2 mm) at a compression density of 5 g/cm³, the tantalum powder compact is then sintered at 1000~1150° C. for 10~20 min to obtain a tantalum powder sintered body (preferably the shrinkage of the compact is in the range of 5~10% after being sintered), and then the tantalum powder sintered body is charged at 6~10V (for example 8~10V) (for example charged in a 0.01 wt % phosphoric acid), a tantalum anode having a specific capacitance of 200000~580000 μFV/g, preferably 220000~450000 μFV/g, preferably 300000~400000 μFV/g, is obtained.

In one embodiment, the tantalum powder is compressed into a tantalum powder compact at a compression density of 5 g/cm³, and the tantalum powder compact is then sintered at 1000~1150° C. for 10~20 min to obtain a tantalum powder sintered body, and then the tantalum powder sintered body is charged at 6~10V (for example 8~10V), a tantalum anode having a leakage current of <9 nA/μFV, preferably <6 nA/μFV, preferably <3 nA/μFV, preferably <2 nA/μFV, preferably <1 nA/μFV, and preferably <0.5 nA/μFV, is obtained.

In one embodiment, the tantalum powder is compressed into a tantalum powder compact at a compression density of 5 g/cm³, and the tantalum powder compact is then sintered at 1000~1150° C. for 10~20 min to obtain a tantalum powder sintered body, and then the tantalum powder sintered body is charged at 6~10V (for example 8~10V), a tantalum anode having a dielectric loss (tan δ) of <100%, preferably <80%, preferably <60%, preferably <40%, is obtained.

In one embodiment, when the tantalum powder is sintered at 1100~1150° C. for 20 min and charged at 10V, a tantalum anode having a specific capacitance of 200000~350000 μFV/g is obtained.

In one embodiment, when the tantalum powder is sintered at 1100~1150° C. for 20 min and charged at 10V, a tantalum anode having a leakage current of 0.3~0.5 nA/μFV is obtained.

In one embodiment, when the tantalum powder is sintered at 1100~1150° C. for 20 min and charged at 10V, a tantalum anode having a dielectric loss (tan δ) of 30~55% is obtained.

In one embodiment, when the tantalum powder is sintered for 10 min at 1100~1150° C. and charged at 8V, a tantalum anode having a specific capacitance of 400000~580000 μFV/g is obtained.

In one embodiment, when the tantalum powder is sintered at 1100~1150° C. for 10 min and charged at 8V, a tantalum anode having a leakage current of 0.7~2.8 nA/μFV is obtained.

In one embodiment, when the tantalum powder is sintered at 1100~1150° C. for 10 min and charged at 8V, a tantalum anode having a dielectric loss (tan δ) of 55~61% is obtained.

Yet another aspect of the present disclosure provides a tantalum powder compact, which is obtained by compressing the tantalum powder of the disclosure, for example by compressing at a compression density of 4~6 g/cm³.

Yet another aspect of the present disclosure provides a tantalum powder sintered body, which is obtained by sintering of the tantalum powder compact of the present disclosure.

In one embodiment, the sintering comprises sintering the tantalum powder compact at 1000~1200° C. for 10~20 min.

In still another aspect of the present disclosure provides a tantalum anode obtained by charging the tantalum powder sintered body.

In one embodiment, the charging comprises putting the tantalum powder sintered body in an acid solution for anodization.

In one embodiment, the charging comprises anodizing the tantalum powder sintered body by putting the tantalum powder sintered body in an electrolyte (for example, phosphoric acid, for example, phosphoric acid having a concentration of 0.01 to 0.1 wt %).

In one embodiment, the charging comprises charging the tantalum powder sintered body at 6 to 10V (for example, 8 to 10V).

Yet another aspect of the present disclosure provides an electrolytic capacitor comprising a tantalum anode of the present disclosure.

Yet another aspect of the present disclosure provides a method of preparing tantalum powder, comprising:
1) obtaining raw tantalum powder, wherein the raw tantalum powder contains boron in an amount of 30~300 ppm and has a specific surface area of 1~20 m²/g;
2) granulating the tantalum powder to obtain a pre-agglomerated powder, wherein the pre-agglomerated powder has a bulk density of 1~1.5 g/cm³;
3) subjecting (for example sequentially) the pre-agglomerated powder to one or more of the following steps: heat treatment, sieving, oxygen reduction treatment, and nitrogen doping;
4) subjecting (for example sequentially) the powder obtained in the previous step to one or more of the following steps: acid washing, water washing, drying and sieving, to obtain a tantalum powder product.

In one embodiment, the raw tantalum powder has a specific surface area of from 4~20 m²/g, for example from 5 to 15 m²/g, for example from 5 to 13 m²/g, for example from 6 m²/g, 7 m²/g, 8 m²/g, 9 m²/g, 10 m²/g, 11 m²/g, or 12 m²/g.

In one embodiment, step 1) comprises: reducing a tantalum fluoride salt with a reducing agent in a molten diluent to obtain a raw tantalum powder.

In one embodiment, the diluent comprises potassium chloride and potassium fluoride.

In one embodiment, in the diluent, KCl:KF=18~24:10~12 (weight ratio).

In one embodiment, the reducing agent comprises metallic sodium.

In one embodiment, the reducing agent is used in an amount substantially sufficient to reduce all of the tantalum fluoride salt.

In one embodiment, the tantalum fluoride salt comprises potassium fluotantalate ($K_2TaF_7$).

In one embodiment, the weight ratio of the tantalum fluoride salt (for example, $K_2TaF_7$) to the diluent is from 2~5:300~400, for example 2.5~5:300~340.

In one embodiment, the diluent also contains an additive $K_2SO_4$.

In one embodiment, the weight ratio of $K_2SO_4$ to the diluent is 400~600:300000~400000, or 500~550: 300000~340000.

In one embodiment, the diluent further comprises boron element.

In one embodiment, the weight ratio of boron element in the diluent to the diluent is 1~5:300000~340000, for example 2~3:300000~340000.

In one embodiment, the diluent further contains boric acid, and the weight ratio of the boric acid to the diluent is 18~22:300000~400000, for example 20:300000~340000.

In one embodiment, the method further comprises subjecting the reduced product to one or more of the following steps: crushing, acid washing, water washing, drying and sieving.

In one embodiment, the granulating in step 2) comprises:
mixing raw tantalum powder with a volatilizable liquid to obtain a powder mixed with volatilizable liquid;
drying the powder mixed with volatilizable liquid to obtain a dried powder;
crushing and sieving the dried powder, wherein the mesh number of the screen for sieving is 120~170 mesh, and powder that passes through the screen is pre-agglomerated powder.

In one embodiment, the pre-agglomerated powder has a specific bulk density of from 0.8 τ' to 1.2 τ', for example from 0.9 τ' to 1.1 τ', and further for example τ', wherein τ' is mathematically related to the specific surface area x (in m²/g) of the raw tantalum powder as follows:

$$\tau' = -1.39E-03x^2 - 6.30E-03x' + 1.39E+00, R^2 = 0.993.$$

In one embodiment, the volatilizable liquid comprises water.

In one embodiment, in step 2), the raw tantalum powder is mixed with water in a ratio of 4-6:1 (for example, 5:1) by weight.

In one embodiment, the water may be pure water or an aqueous solution containing a doping element.

In one embodiment, in step 2), the water contains phosphorus element.

In one embodiment, in step 2), the water contains 100 to 1000 ppm phosphoric acid, for example 300 to 500 ppm phosphoric acid.

In one embodiment, in step 2), the raw tantalum powder and water are mixed and then stirred uniformly.

In one embodiment, in step 2), the raw tantalum powder and water are added into a water tank equipped with a stirring baffle and stirred.

In one embodiment, in step 2), the stirring baffle rotates at a speed of 100~300 r/min, and after stirring for 20~50 min, the tantalum powder is taken out to obtain a water-containing tantalum powder.

In one embodiment, in step 2), the drying is performed under a temperature of 80~120° C.

In one embodiment, in step 2), the powder mixed with volatilizable liquid is dried in a vacuum oven.

In one embodiment, in step 2), the drying is performed for 10~20 hours.

In one embodiment, in step 2), the pre-agglomerated powder has a bulk density of greater than 1 g/cm³, for example 1 to 2 g/cm³, for example 1 to 1.5 g/cm³.

In one embodiment, in step 2), the dried powder is granulated by vibrating sieving.

In one embodiment, in step 2), the dried powder is granulated by rotary vibrating and sieving.

In one embodiment, in step 2), the dried powder is granulated by tumbler vibrating and sieving.

In one embodiment, in step 2), the sieving is performed with a 100 to 200 mesh (for example, 150 mesh) screen.

In one embodiment, in step 3), the pre-agglomerated powder is subjected to the steps of heat treatment, oxygen reduction treatment and nitrogen doping sequentially.

In one embodiment, in step 3), the heat treatment is performed at a temperature of 1000 to 1500° C., for example 1000 to 1200° C.

In one embodiment, in step 3), the heat treatment has a heat preservation time of 10 to 60 min, for example 10 to 30 min.

In one embodiment, in step 3), the heat treatment is performed in a non-oxidizing environment.

In one embodiment, the non-oxidizing environment is a vacuum environment, or an environment containing an inert gas and/or a reducing gas.

In one embodiment, the reducing gas is a gas capable of reducing a metal oxide, for example, a gas capable of reducing a tantalum oxide.

In one embodiment, in step 3), the heat treatment is performed in a vacuum environment.

In one embodiment, between the heat treatment and the oxygen reduction treatment, the powder obtained after heat treatment is crushed and sieved through an 80~120 mesh (for example, 100 mesh) sieve, and the powder that passes through the sieve is collected.

In one embodiment, the oxygen reduction treatment in step 3) comprises the steps of doping magnesium powder into the powder obtained after heat treatment and then heating.

In one embodiment, in step 3), the weight of the magnesium powder doped during the oxygen reduction treatment is 4~6 wt % of the weight of the powder after the heat treatment.

In one embodiment, in step 3), the oxygen reduction is performed at a temperature of 700~800° C.

In one embodiment, in step 3), the oxygen reduction is performed in argon atmosphere.

In one embodiment, in step 3), after the oxygen reduction, the temperature of the oxygen reduced powder is reduced to 300~450° C., and then a nitrogen doping treatment is performed.

In one embodiment, in step 3), the nitrogen doping treatment includes a step of heating the oxygen reduced powder in a nitrogen-containing atmosphere.

In one embodiment, in step 3), the nitrogen doping treatment is performed under a pressure of 0.1 to 0.12 MPa of nitrogen.

In one embodiment, the acid washing refers to adding the powder obtained after the heat treatment, the oxygen reduction treatment and/or the nitrogen doping treatment into a solution containing hydrochloric acid and hydrogen peroxide (for example, containing 10 wt % hydrochloric acid and 0.5 wt % hydrogen peroxide) and stirring and washing.

In one embodiment, the water washing refers to adding deionized water to the powder obtained after the acid washing, stirring, allowing to stand, and then removing the upper layer of liquid. Repeating the above operation one or more times, finally loading the powder into a filter tank for filtering and washing, the filtering and washing are performed with deionized water until the conductivity of the effluent is lower than 5 μs/cm, and a washed powder is obtained after filtering.

In one embodiment, in step 4, the drying refers to vacuum drying, and a second dried tantalum powder is obtained after the drying.

In one embodiment, in step 4), sieving is performed with a screen having a mesh number of 80 to 120 mesh (for example, 100 mesh).

In one embodiment, other steps or combinations thereof than those described in the present disclosure that substantially affect the electrical properties of the product are not included between the steps of the disclosed method.

In one embodiment, the steps of the method of the present invention are performed sequentially.

In one embodiment, the powder that passes through the screen is collected after sieving.

In one embodiment, the oxygen content of the raw tantalum powder is from 0.8 $\alpha'$ to 1.2 $\alpha'$ ppm, for example from 0.9 $\alpha'$ to 1.1 $\alpha'$ ppm, for example $\alpha'$ ppm; wherein $\alpha'=-68.5$ $x'^3+2197.3$ $x'^2-18616.4$ $x'+62307.8$, $x'$ is the specific surface area of the tantalum raw powder in unit of $m^2/g$.

In one embodiment, the raw tantalum powder has a nitrogen content of from 0.8 $\beta'$ to 1.2 $\beta'$ ppm, for example from 0.9 $\beta'$ to 1.1 $\beta'$ ppm, for example $\beta'$ ppm; wherein $\beta'=98.1$ $x'-388.8$, $x'$ is the specific surface area of the raw tantalum powder in unit of $m^2/g$.

In one embodiment, the raw tantalum powder has a boron content of from 0.8 $\gamma'$ to 1.2 $\gamma'$ ppm, for example from 0.9 $\gamma'$ to 1.1 $\gamma'$ ppm, for example $\gamma'$ ppm; wherein $\gamma'=0.28$ $x'^3-4.72$ $x'^2+35.11$ $x'-42.02$, $x'$ is the specific surface area of the raw tantalum powder in unit of $m^2/g$.

In one embodiment, the raw tantalum powder has a potassium content of from 0.8 $\epsilon'$ to 1.2 $\epsilon'$ ppm, for example from 0.9 $\epsilon'$ to 1.1, for example $\epsilon'$ ppm; wherein $\epsilon'=-9.39$ E-02 $x^3+3.13$ E+00 $x^2-2.64$ E+01 $x+9.40$ E+01, $x'$ is the specific surface area of the raw tantalum powder in unit of $m^2/g$.

In one embodiment, the tantalum raw powder has a sodium content of 1 to 10 ppm, for example 3 to 5 ppm.

In one embodiment, $\alpha'$, $\beta'$, $\gamma'$ and $\epsilon'$ are all positive numbers.

In one embodiment, $x'$ is the specific surface area of the raw tantalum powder in unit of $m^2/g$, wherein $x'=4\sim20$, for example 5 to 13, for example 6, 7, 8, 9, 10, 11, 12, 13, 14, 15, 16, 17, 18, 19 or 20.

In one embodiment, the tantalum powder is compressed into a tantalum powder compact at a compression density of 5 $g/cm^3$, then the tantalum powder compact is sintered at 1000~1150° C. for 10~20 min to obtain a tantalum powder sintered body, and then the tantalum powder sintered body is charged at 8~10V, an anode having a leakage current of <9 nA/μFV, preferably <6 nA/μFV, preferably <3 nA/μFV, preferably <2 nA/μFV, preferably <1 nA/μFV, and preferably <0.5 nA/μFV, is obtained.

In one embodiment, the tantalum powder is compressed into a tantalum powder compact at a compression density of 5 $g/cm^3$, then the tantalum powder compact is sintered at 1000~1150° C. for 10~20 min to obtain a tantalum powder sintered body, and then the tantalum powder sintered body is charged at 8~10V, an anode having a dielectric loss (tan δ) of <100%, preferably <60%, and preferably <40%, is obtained.

In one embodiment, the charging refers to putting the anode compact in $H_3PO_4$ solution in a concentration of 0.01 w/% and charging the anode compact at a voltage of 8V to 10V to form a charged anode compact.

In one embodiment, tantalum powder is compressed into a 2.2 mm×1.0 mm×1.7 mm tantalum powder compact at a compression density of 5 $g/cm^3$, no cracks exists on the surface of the tantalum powder compact when it is examined with a magnifier by a magnification of 10 times.

In one embodiment, the tantalum powder of the present disclosure is prepared by the preparation method for the tantalum powder of the present disclosure.

In one embodiment, the preparation method for the tantalum powder of the present disclosure produces the tantalum powder of the present disclosure.

The tantalum powder is the final tantalum powder product unless otherwise specified.

Interpretation of Terms:

Throughout the specification, the unit ppm means "parts per million" expressed in terms of weight ratio unless otherwise specifically stated.

In one embodiment, the FSSS particle size (FSSS/μm) is determined according to the method specified in "Test method for fisher number of metal powders and related compounds" (Standard No. GB/T3249-2009).

In one embodiment, the bulk density (SBD) is determined according to the method specified in Standard "Metallic powders. Determination of apparent density. Part 1: Funnal method" (Standard No. GB/T1479.1-2011).

In one embodiment, the particle size distribution is determined according to the method specified in Standard "Metallic powders—Determination of particle size by dry sieving" (Standard No. GB/T1480-2012), and the process of taking sample is performed according to the method specified in Standard "Powders for powder metallurgical purposes—Sampling" (Standard No. GB/T5314-2011).

In one embodiment, the detection methods of elements in the tantalum powder are all determined according to Chinese national standards, which include "GB/T15076.8-2008 Method for chemical analysis of tantalum and niobium. Determination of carbon and sulphur contents", "GB/T15076.9-2008 Method for chemical analysis of tantalum and niobium. Determination of iron, chromium, nickel, manganese, titanium, aluminum, copper, tin, lead and zirconium contents in tantalum", "GB/T15076.12-2008 Method for chemical analysis of tantalum and niobium. Determination of phosphorus content in tantalum", "GB/T15076.14-2008 Method for chemical analysis of tantalum and niobium. Determination of oxygen content", "GB/T15076.15-2008 Method for chemical analysis of tantalum and niobium. Determination of hydrogen content", and "GB/T15076.16-2008 Method for chemical analysis of tantalum and niobium. Determination of sodium and potassium contents".

In one embodiment, the analysis of the content of impurities in the tantalum powder is determined according to Chinese standard GB/T15076.1~15076.15.

In one embodiment, the physical properties of the tantalum powder are as specified in industry Standard YS/T573-2007.

In one embodiment, when the particle size of the powder is expressed in mesh number, the symbol "+" or "−" before the mesh number means "not passing through" or "passing through" the screen with the corresponding mesh number, respectively. For example, "−100 mesh" means passing through a 100 mesh screen, and "+150 mesh" means not passing through a 150 mesh screen. Therefore, "−100~+150 mesh" indicates that the powder could pass through a 100 mesh screen but could not pass through a 150 mesh screen.

In the present disclosure, some numbers are expressed using scientific notation, E+00 denotes $10^0$, E+01 denotes $10^1$, E−01 denotes $10^{-1}$, and so on.

Beneficial Effects of the Invention

One or more embodiments of the present invention may have one or more of the following beneficial effects:
1) the tantalum powder has higher specific capacitance;
2) the tantalum powder has lower leakage current;
3) the tantalum powder has lower dielectric loss (tan δ);
4) the tantalum powder has good formability;
5) the preparation method of the tantalum powder is simple;
6) the preparation method of the tantalum powder has low cost.

DETAILED DESCRIPTION OF PREFERRED EMBODIMENTS

Embodiments of the present invention will be described in detail below with reference to examples, but it will be understood by a person skilled in the art that the following examples are only illustrative of the present invention and should not be construed as limiting the scope of the present invention. The examples, in which specific conditions are not specified, are performed according to conventional conditions or conditions recommended by the manufacturer. The reagents or instruments, in which specific manufacturers are not specified, are all conventional products which are commercially available.

EXAMPLE 1

S1) Preparation of the raw tantalum powder, including the following steps S1a)~S1c) S1a) A kg of potassium chloride (KCl), B kg of potassium fluoride (KF), C g of potassium sulfate ($K_2SO_4$) and D g of boric acid ($H_3BO_3$) were added into a reaction vessel, the temperature was raised to E° C., and preserved with stirring for 30 minutes.

S1b) F kg of potassium fluotantalate ($K_2TaF_7$) was added into the reaction vessel. After the temperature returned to G° C., metal sodium in a stoichiometric ratio (namely, a molar ratio of 1:5) was added according to the chemical reaction of $K_2TaF_7+5Na=Ta+5NaF+2KF$, and the mixture was reacted for a period of time.

S1c) The step 1b) was repeated H times until the cumulative amount of the potassium fluotantalate added was I kg. After the reaction was completed, the product was discharged after it was cooled, the discharged product was crushed into small pieces by a crusher, and subjected to acid washing, water washing, drying and sieving to obtain a raw tantalum powder. The properties of the raw tantalum powder were shown in Table 2.

S2) The raw tantalum powder and deionized water containing J ppm phosphoric acid were added into a water tank equipped with a stirring baffle rotating at a speed of 200 r/min. After being stirred for 30 min, a water-containing powder was obtained. The water-containing powder was dried by a vacuum drying oven at a temperature of 80° C. for a period time of 16 h, and the dried powder essentially did not contain water. The dried powder was crushed, and the crushed powder was sieved by a vibrating sieve with the mesh number of 150 mesh, no extra water being added during being sieved. The sieved extra powder was pre-agglomerated powder, and the bulk density-SBD of the pre-agglomerated powder was 1.0~1.5 g/cm³. Specifics were shown in Table 2.

S3) The pre-agglomerated powder was added into a crucible, the crucible was put into a vacuum heat treatment furnace, heated to K° C. under a vacuum degree of below 1.33 Pa, and the temperature was preserved for L min. The powder obtained from heat treatment was sieved with a 100 mesh screen, and the powder with a particle size of −100 mesh was collected, and thus a heat treated powder was obtained.

S4) Magnesium powder was added into the heat treated powder in an amount of M wt %, then they were put into a crucible, and the crucible was put into a reaction container protected by argon, being kept at a temperature of N° C. for 3 hours.

S5) After the temperature of the reaction container in the previous step decreased from N° C. to O° C., the gas in the container was evacuated until the pressure in the container was close to 0 MPa. Nitrogen ($N_2$) was charged into the container until the pressure in the container reached 0.105 MPa, this being maintained for 4 h, after which the container was cooled to room temperature, and a passivation treatment was performed by intermittently charging oxygen-containing gas for several times, and thereby an oxygen-reduced and nitrogen-doped powder was obtained.

S6) The oxygen-reduced and nitrogen-doped powder was added into a mixture of 10 wt % hydrochloric acid and 0.5 wt % hydrogen peroxide, stirred and washed for 2 h, and stood for 15 min, after which an acid containing solution was poured out, so as to remove impurities such as residual magnesium, magnesium oxide and the like in the product. The above adding deionized water—stirring for 10 min—allowing to stand for 15 min, were performed one more time, and an acid-washed powder was obtained. The acid-washed powder was put into a filter tank for filtering and washing, where deionized water was used until the electrical conductivity of the filtrate was lower than 5 μs/cm. After filtration, a water-washed powder was obtained. The water-washed powder was dried, sieved by a 100-mesh screen, and the powder of −100 mesh was collected, which was the tantalum powder product.

COMPARATIVE EXAMPLE 1

The procedures of Comparative Example 1 were similar to those in Example 1 except the following step.

S2) The raw tantalum powder and the deionized water containing J ppm phosphoric acid with a weight ratio of 10:1 were added into a tank equipped with a stirring baffle. The stirring baffle rotated at a speed of 300 r/min. After being stirred for 30 min, a water-containing tantalum powder was taken from the tank, then added with deionized water in an amount of 12% by weight of the tantalum powder by spraying, and the sprayed water-containing powder was sieved by a vibrating sieve, and the sieved wet powder was dried in a vacuum drying oven at a temperature of 90° C. for 18 h, and thereby a pre-agglomerated powder was obtained.

COMPARATIVE EXAMPLE 2

The procedures of Comparative Example 2 were similar to those in Example 1 except the following step.

S2) The raw tantalum powder and the deionized water containing J ppm phosphoric acid with a weight ratio of 10:1 were added into a tank equipped with a stirring baffle. The stirring baffle rotated at a speed of 300 r/min. After being stirred for 30 min, a water-containing tantalum powder was taken from the tank, then added with deionized water in an amount of 12% by weight of the tantalum powder by spraying, and the sprayed water-containing powder was sieved by a vibrating sieve, and the sieved wet powder was dried in a vacuum drying oven at a temperature of 90° C. for 18 h, and thereby a pre-agglomerated powder was obtained.

The process parameters for preparing tantalum powders of the Examples and Comparative Examples were shown in Table 1.

The chemical and physical properties of the raw tantalum powder and the pre-agglomerated powder were shown in Table 2.

The chemical and physical properties of the pre-agglomerated powder and the tantalum powder product were shown in Table 3.

The electrical properties of the tantalum powder product were shown in Table 4.

the anode compact being in a 30 wt % $H_2SO_4$ solution at room temperature, and the leakage current was measured with the anode compact being in a 0.1 wt % $H_3PO_4$ solution.

The matters relating to the electrical performance test of tantalum powder which are not fully described can be seen in Chinese standards GB/T 3137-2007 Testing method for electrical properties of tantalum powder.

In order to characterize the formability of high capacitance tantalum powder more intuitively, the tantalum powder was compressed into a tantalum powder compact with a size of 2.2 mm×1.0 mm×1.7 mm, and the tantalum powder compact was placed under an electronic magnifier with a magnification of 10 times and was observed to check whether apparent cracks exist on its surface. If the cracks exist on the surface, the formability of the tantalum powder is poor; otherwise, if the cracks do not exist on the surface, the formability of the tantalum powder is good.

TABLE 1

|  | KCl A/kg | KF B/kg | $K_2SO_4$ C/g | $H_3BO_3$ D/g | Temperature when beginning to stir E/° C. | $K_2TaF_7$ F/kg | Temperature to add sodium G/° C. | Repeating times H/time | $K_2TaF_7$ total amount I/kg | Phosphorus doping J/ppm | Temperature of heat treatment K/° C. | Time of Heat preservation L/min | Magnesium doping M/wt% | Temperature of oxygen reduction N/° C. | Temperature of nitrogen doping O/° C. |
|---|---|---|---|---|---|---|---|---|---|---|---|---|---|---|---|
| Example 1 | 240 | 100 | 500 | 20 | 850 | 5 | 830 | 14 | 75 | 300 | 1100 | 20 | 4.8 | 790 | 300 |
| Example 2 | 200 | 120 | 550 | 20 | 850 | 5 | 830 | 14 | 45 | 380 | 1070 | 20 | 4.8 | 780 | 300 |
| Example 3 | 180 | 120 | 550 | 20 | 850 | 2.5 | 800 | 13 | 35 | 400 | 1060 | 20 | 4.9 | 770 | 410 |
| Example 4 | 180 | 120 | 550 | 20 | 850 | 2.5 | 800 | 9 | 25 | 400 | 1050 | 20 | 4.8 | 770 | 410 |
| Comparative Example 1 | 240 | 100 | 500 | 5 | 850 | 5 | 830 | 14 | 75 | 300 | 1100 | 20 | 4.8 | 790 | 300 |
| Comparative Example 2 | 200 | 120 | 550 | 40 | 850 | 3 | 830 | 14 | 45 | 380 | 1070 | 20 | 4.8 | 780 | 300 |

The analysis of the impurities content of the tantalum powder was performed according to the regulation of Chinese standard GB/T15076.1-15076.15.

The physical properties of tantalum powder were tested according to the regulation of industry Standard YS/T573-2007.

The electrical property test of the tantalum powder comprised compressing 30 mg of tantalum powder product into a cylindrical tantalum powder compact with a diameter of 2 mm at a compression density of 5.0 g/cm$^3$, and a tantalum wire serving as a lead wire was preset in the tantalum powder before pressing. The tantalum powder compact was subjected to vacuum sintering at 1100~1150° C. for 10~20 min to form an anode compact (namely a tantalum powder sintered body). The shrinkage rate of the sintered compact was within 5~10%. The sintering conditions were shown in Table 4.

The anode compact was placed in a $H_3PO_4$ solution having a concentration of 0.01 wt % and charged at a voltage of 8V~10V to form an anode compact, with the charging voltage shown in Table 4. The specific capacitance and dielectric loss were measured at a frequency of 120 Hz with As shown in Table 1, for Examples 1~4, KCl and KF were diluents in the reduction reaction process. The weight ratio of the boric acid to the diluent was 20:300000~340000. The weight ratio of the $K_2SO_4$ to the diluent was 500~550: 300000~340000. The weight ratio of $K_2TaF_7$ to the diluent was 2.5~5:300~340. In the diluent, KCl:KF=18~24:10~12 (weight ratio).

TABLE 2

Physical and chemical properties of the raw tantalum powder and the pre-agglomerated powder

| | Raw tantalum powder | | | | | | pre-agglomerated powder |
|---|---|---|---|---|---|---|---|
| | Chemical components (ppm) | | | | | BET | |
| | O | N | K | Na | B | (m$^2$/g) | SBD (g/cm$^3$) |
| Example 1 | 14890 | 180 | 28 | 4 | 58 | 5.8 | 1.31 |
| Example 2 | 22400 | 450 | 41 | 5 | 96 | 8.9 | 1.22 |
| Example 3 | 34200 | 840 | 61 | 4 | 164 | 11.4 | 1.15 |
| Example 4 | 39200 | 760 | 70 | 4 | 212 | 12.5 | 1.09 |

TABLE 2-continued

Physical and chemical properties of the raw tantalum powder and the pre-agglomerated powder

| | Raw tantalum powder | | | | | | pre-agglomerated powder |
|---|---|---|---|---|---|---|---|
| | Chemical components (ppm) | | | | | BET | |
| | O | N | K | Na | B | (m²/g) | SBD (g/cm³) |
| Comparative Example 1 | 10120 | 260 | 26 | 4 | 8 | 3.89 | 1.76 |
| Comparative Example 2 | 30180 | 380 | 52 | 3 | 168 | 9.2 | 1.65 |

As shown in Table 2, the raw tantalum powder and the pre-agglomerated powder of Examples 1-4 conform to the following relationships.

The mathematical relationship between the O content $\alpha'$ (in ppm) and the specific surface area $x'$ (in m²/g) of the raw tantalum powder conforms to:

$$\alpha' = -68.5x'^3 + 2197.3x'^2 - 18616.4x' + 62307.8, R^2 = 1.$$

The mathematical relationship between the N content $\beta'$ (in ppm) and the specific surface area $x'$ (in m²/g) of the raw tantalum powder conforms to:

$$\beta' = 98.1x' - 388.8, R^2 = 0.9.$$

The mathematical relationship between the B content $\varepsilon'$ (in ppm) and the specific surface area $x'$ (in m²/g) of the raw tantalum powder conforms to:

$$\gamma' = 0.28x'^3 - 4.72x'^2 + 35.11x' - 42.02, R^2 = 1.$$

The mathematical relationship between the K content $\gamma'$ (in ppm) and the specific surface area $x'$ (in m²/g) of the raw tantalum powder conforms to:

$$\varepsilon' = -9.39E{-}02x^3 + 3.13E{+}00x^2 - 2.64E{+}01x + 9.40E{+}01, R^2 = 1.$$

The content of Na is less than 5 ppm.

The mathematical relationship between the bulk density of the pre-agglomerated powder $\tau'$ and the specific surface area $x'$ (in m²/g) of the raw tantalum powder conforms to:
$\tau' = -1.39E{-}03x'^2 - 6.30E{-}03x' + 1.39E{+}00, R^2 = 0.993.$ The tantalum powder products of Examples 1-4 shown in Table 3 comply with the following rules:

the mathematical relationship between the O content $\alpha$ (in ppm) and the specific surface area $x$ (in m²/g) of the tantalum powder conforms to:

$$\alpha = -26.7x^3 + 802.4x^2 - 4496.9x + 16038.2, R^2 = 1;$$

the mathematical relationship between the N content $\beta$ (in ppm) and the specific surface area $x$ (in m²/g) of the tantalum powder conforms to:

$$\beta = 197.1x + 995.0, R = 1.0;$$

the mathematical relationship between the B content $\gamma$ (in ppm) and the specific surface area $x$ (in m²/g) of the tantalum powder conforms to:

$$\gamma = -0.48x^3 + 13.95x^2 - 108.84x + 277.20, R^2 = 1;$$

the mathematical relationship between the K content $\varepsilon$ (in ppm) and the specific surface area $x$ (in m²/g) of the tantalum powder conforms to:

$$\varepsilon = 0.45x^3 - 10.48x^2 + 79.94x - 173.43, R^2 = 1;$$

the mathematical relationship between the ratio of the O content to the N content and the specific surface area $x$ (in m²/g) of the tantalum powder conforms to:

$$\lambda = 0.62x + 2.04, R^2 = 1.00;$$

the mathematical relationship between the ratio $\chi$ of the B content to the specific surface area $x$ of the tantalum powder and the specific surface area $x$ (in m 2/g) of the tantalum powder conforms to:

$$\chi = -6.11E{-}02x^3 + 1.63E{+}00x^2 - 1.25E{+}01x + 3.39E{+}01, R^2 = 1.00;$$

the mathematical relationship between the percentage $\eta$ of powder not passing through 170 mesh in the total weight of the tantalum powder and the specific surface area $x$ (in m²/g) of the tantalum powder conforms to:

$$\eta = -4.55E{-}02x^3 + 1.39E{+}00x^2 - 1.45E{+}01x + 5.70E{+}01, R^2 = 1.00;$$

the mathematical relationship between the percentage $\zeta$ of the powder that can pass through 170 mesh while cannot pass through 400 mesh in the total weight of the tantalum

TABLE 3

Physical and chemical properties of the tantalum powder product

| | Chemical properties (ppm) | | | | | BET | FSSS | SBD | +100 mesh | −100~+150 mesh | −150~+170 mesh | −170~+400 mesh | −400 mesh | O content/ N content | B content/ BET |
|---|---|---|---|---|---|---|---|---|---|---|---|---|---|---|---|
| | O | N | K | B | P | m2/g | um | g/cm3 | (%) | (%) | (%) | (%) | (%) | | |
| Example 1 | 10280 | 2010 | 21 | 22 | 220 | 5 | 1 | 1.79 | 0 | 11.32 | 2.36 | 77.48 | 8.84 | 5.11 | 4.40 |
| Example 2 | 16500 | 2420 | 28 | 46 | 300 | 7.6 | 0.98 | 1.65 | 0 | 5.42 | 1.80 | 73.10 | 19.68 | 6.82 | 6.05 |
| Example 3 | 25700 | 3100 | 34 | 114 | 340 | 10.3 | 0.86 | 1.43 | 0 | 2.58 | 2.88 | 66.08 | 28.46 | 8.29 | 11.07 |
| Example 4 | 30210 | 3250 | 52 | 146 | 330 | 11.6 | 0.69 | 1.28 | 0 | 3.56 | 1.29 | 62.93 | 32.22 | 9.30 | 12.59 |
| Comparative Example 1 | 8940 | 1980 | 19 | 6 | 240 | 3.74 | 1.2 | 1.91 | 0 | 38.4 | 5.18 | 48.38 | 8.04 | 4.52 | 1.60 |
| Comparative Example 2 | 19980 | 2250 | 43 | 148 | 280 | 8.2 | 1.1 | 2.02 | 0 | 45.18 | 6.18 | 42.62 | 6.04 | 8.88 | 18.05 | powder and the specific surface area x (in m²/g) of the tantalum powder conforms to:

$$\zeta=-0.11x^2-0.40x+82.33, R=1.00;$$

the mathematical relationship between the percentage θ of powder that can pass through 400 in the total weight of the tantalum powder meshes and the specific surface area x (in m2/g) of the tantalum powder conforms to:

$$\theta=-0.15x^2+6.01x-17.44, R^2=1.00;$$

the mathematical relationship between the bulk density τ and the specific surface area x (in m²/g) of the tantalum powder conforms to:

$$\tau=-6.14E-03x^2+2.53E-02x+1.82E+00, R^2=1.00;$$

the mathematical relationship between the FSSS particle size Ψ and the specific surface area x (in m²/g) of the tantalum powder conforms to:

$$\psi=-2.22E-03x^3+4.39E-02x^2-2.93E-01x+1.64E+00, R^2=1.00.$$

TABLE 4

Electrical properties of the tantalum powder product

| | Sintering condition °C./min | Charing voltage V | Specific capacitance μFV/g | Leakage current nA/μFV | Dielectric loss % | Formability |
|---|---|---|---|---|---|---|
| Example 1 | 1150/20 | 10 | 214232 | 0.32 | 53.6 | Good |
| Example 2 | 1100/20 | 10 | 321424 | 0.42 | 32.3 | Good |
| Example 3 | 1100/10 | 8 | 405633 | 0.79 | 60.8 | Good |
| Example 4 | 1100/10 | 8 | 561306 | 2.8 | 57.9 | Good |
| Comparative Example 1 | 1150/20 | 10 | 168920 | 0.42 | 106.2 | Cracked |
| Comparative Example 2 | 1150/20 | 10 | 264012 | 4.9 | 149.2 | Cracked |

As shown in Table 4:
the relationship between the leakage current μ (nA/μFV) and the specific capacitance z (μFV/g) for the tantalum powders of Examples 1 to 4 conforms to:

$$\mu=5.02E-17z^3-2.92E-11z^2+5.61E-06z-3.72E-02, R^2=1.00.$$

As shown in Table 4, the tantalum powders of Examples 1~4 have the following electrical properties.

(1a) For the tantalum powder with the specific capacitance of 20000~35000 μFV/g, the leakage current is 0.32~0.42 nA/μFV.

(1b) For the tantalum powder with the specific capacitance of 40000~60000 μFV/g, the leakage current is 0.79~2.8 nA/μFV.

(2) The dielectric loss tan δ of the tantalum powder is about 30~60%.

(3) The tantalum powder compact has good formability, which indicates that the tantalum powder compact is smooth and has no cracks.

In contrast, the tantalum powders of Comparative Examples 1~2 have the following electrical properties:

(1a) For the tantalum powder with the specific capacitance of 15000~17000 μFV/g, the leakage current is 0.42 nA/μFV.

(1b) For the tantalum powder with the specific capacitance of 20000~35000 μFV/g, the leakage current is 4.9 nA/μFV.

(2) The dielectric loss tan δ of the tantalum powder is 100~200%

(3) Cracks exist on the surface of the tantalum powder compact.

It is clear from the results of the examples that the tantalum powder of the above examples has one or more of the following advantages:
(1) the specific capacitance is high;
(2) the leakage current is low;
(3) the dielectric loss is small;
(4) good formability.

Without being limited by theory, by adjusting the amount of boric acid added to the reaction system during the reduction process together with subsequent treatments to control the content of boron added in the tantalum powder within a certain range, combined with technologies of pre-agglomeration and heat treatment, the above examples prepare tantalum powders having high specific capacitance, low leakage current and good formability.

Without being limited by theory, by virtue of adjusting the composition (for example, boron content) and the structure (for example, particle size distribution) of the tantalum powder in one or more of the steps, the disclosed method prepares a tantalum powder having high specific capacitance, low leakage current, and good formability.

Although specific embodiments of the invention have been described in detail, those skilled in the art will appreciate, various modifications and substitutions of those details may be made in light of the overall teachings of the disclosure, and such variations are within the scope of the invention. The full scope of the invention is given by the appended claims and any equivalents thereof.

What is claimed is:

1. A method for preparing tantalum powder, comprising:
1) reducing a tantalum fluoride salt with a reducing agent in a molten diluent to obtain a raw tantalum powder, wherein said raw tantalum powder contains boron in an amount of 30~300 ppm and has a specific surface area of 5~13 m²/g;
2) granulating said tantalum powder to obtain a pre-agglomerated powder, wherein the pre-agglomerated powder has a bulk density of 1~1.5 g/cm³;
the granulating comprises: mixing raw tantalum powder with water to obtain a powder mixed with water; drying the powder mixed with water to obtain a dried powder; and crushing and sieving the dried powder, wherein the mesh number of the screen for sieving is 120~170 mesh, and powder that passes through the screen is pre-agglomerated powder; and
3) sequentially subjecting said pre-agglomerated powder to one or more of the following steps: heat treatment, sieving, oxygen reduction treatment, and nitrogen doping;
4) sequentially subjecting the powder obtained in the previous step to one or more of the following steps: acid washing, water washing, drying and sieving, to obtain a tantalum powder product;
wherein, the tantalum powder product has an oxygen content of 10000 to 31000 ppm a nitrogen content of 2000 to 3300 ppm; a potassium content of 10 to 50 ppm a boron content of 20 to 150 ppm; and a phosphorous content of 200 to 400 ppm;
wherein the tantalum powder product has a specific surface area of 5~12 m²/g; and the ratio of the boron content of the tantalum powder to the specific surface area of the tantalum powder is 4~13, the boron content is measured in unit of ppm by weight, and the specific surface area is measured in unit of m²/g;

wherein, more than 85% of the total weight of the tantalum powder product can pass through 170;

from 5 to 40% of the total weight of the tantalum powder product can pass through a 400 mesh screen;

the amount of powder that can pass through 170 mesh but can not pass through 400 mesh accounts for 60% to 80% of the total weight of the tantalum powder product.

2. The method of claim 1, wherein the oxygen content of the raw tantalum powder is from $0.8\alpha'$ to $1.2\alpha'$ ppm, wherein $\alpha'=-68.5\ x'^3+2197.3\ x'^2-18616.4\ x'+62307.8$, x' is the specific surface area of the raw tantalum powder in unit of $m^2/g$;

the raw tantalum powder has a nitrogen content of from $0.8\beta'$ to $1.2\beta'$ ppm, wherein $\alpha'=98.1\ x'-388.8$, x' is the specific surface area of the raw tantalum powder in unit of $m^2/g$;

the raw tantalum powder has a boron content of from $0.8\gamma'$ to $1.2\gamma'$ ppm, wherein $\alpha'=-68.5\ x'^3+2197.3\ x'^2-18616.4\ x''=62307.8$, x' the specific surface area of the raw tantalum powder in unit of $m^2/g$;

the raw tantalum powder has a potassium content of from $0.8\varepsilon'$ to $1.2\varepsilon'$ ppm, wherein $\varepsilon'+-9.39E-02x'^3+3.13E+00x'^2-2.64E+01x'+9.40E+01$, x' is the specific surface area of the raw tantalum powder in unit of $m^2/g$;

the raw tantalum powder has a sodium content of 1 to 10 ppm; and $\alpha'$, $\beta'$, $\gamma'$ and $\varepsilon'$ are all positive numbers.

3. The method of claim 1, wherein the tantalum powder product has a bulk density of from 0.8 τ To 1.2 τ $g/cm^3$, wherein τ is mathematically related to the specific surface area x (in $m^2/g$) of the tantalum powder product as follows: $\tau=-6.14E-03x^2+2.53E-02x+1.82E+00$, and x is the specific surface area of tantalum powder product in $m^2/g$.

4. The method of claim 1, wherein the tantalum powder product has a FSSS particle size of 0.8 Ψ to 1.2 Ψ, wherein Ψ is mathematically related to the specific surface area x (in $m^2/g$) of the tantalum powder product as follows: $\Psi=-2.22E-03x^3+4.39E-02x^2-2.93E-01x+1.64E+00$, x is the specific surface area of tantalum powder product in $m^2/g$.

5. The method of claim 1, wherein the powder that can pass through 170 mesh while can not pass 400 mesh in the tantalum powder product accounts for 62% to 78% of the total weight of the tantalum powder product; and 8.84% to 32.22% of the total weight of the tantalum powder product can pass through a 400 mesh screen.

6. The method of claim 1, wherein in step (1), the diluent comprises potassium chloride and potassium fluoride;

in the diluent, the weight ratio of potassium chloride to potassium fluoride is 18~24: 10~12;

the reducing agent comprises metallic sodium;

the tantalum fluoride salt comprises potassium fluotantalate ($K_2TaF_7$); and the weight ratio of the tantalum fluoride salt to the diluent is from 2~5: 300~4004.

7. The method of claim 1, wherein in step (1), the diluent also contains an additive $K_2SO_4$ and the weight ratio of $K_2SO_4$ to the diluent is 400~600: 300000~400000, or 500~550: 300000~340000; and the diluent further comprises boron element, and the weight ratio of boron element in the diluent to the diluent is 1~5:300000~340000.

8. The method of claim 1, wherein in step (2), the water contains 100 to 1000 ppm phosphoric acid.

9. A tantalum powder prepared by a method comprising:

1) reducing a tantalum fluoride salt with a reducing agent in a molten diluent to obtain a raw tantalum powder, wherein the raw tantalum powder contains boron in an amount of 30~300 ppm and has a specific surface area of 5~13 $m^2/g$;

2) granulating the tantalum powder to obtain a pre-agglomerated powder, wherein the pre-agglomerated powder has a bulk density of 1~1.5 $g/cm^3$;

wherein granulating comprises: mixing raw tantalum powder with water to obtain a powder mixed with water; drying the powder mixed with water to obtain a dried powder; and crushing and sieving the dried powder, wherein the mesh number of the screen for sieving is 120~470 mesh, and powder that passes through the screen is pre-agglomerated powder;

3) sequentially subjecting the pre-agglomerated powder to one or more of the following steps: heat treatment, sieving, oxygen reduction treatment, and nitrogen doping; and 4) sequentially subjecting the powder obtained in 3) to one or more of the following steps: acid washing, water washing, drying and sieving, to obtain a tantalum powder product;

wherein the tantalum powder product has an oxygen content of from 10000 to 31000 ppm; a nitrogen content of from 2000 to 3300 ppm; a potassium content of from 10 to 50 ppm; a boron content of from 20 to 150 ppm; and a phosphorous content of from 200 to 400 ppm;

wherein the tantalum powder product has a specific surface area of 5~12 $m^2/g$; and the ratio of the boron content of the tantalum powder to the specific surface area of the tantalum powder is from 4~13, the boron content being measured in units of ppm by weight, and the specific surface area being measured in units of $m^2/g$;

wherein, more than 85% of the total weight of the tantalum powder product can pass through 170 mesh;

from 5 to 40% of the total weight of the tantalum powder product can pass through a 400 mesh screen; and the powder that can pass through 170 mesh but not pass through 400 mesh in the tantalum powder product accounts for 60% to 80% of the total weight of the tantalum powder product.

* * * * *